United States Patent
Chu et al.

(10) Patent No.: US 12,045,093 B2
(45) Date of Patent: Jul. 23, 2024

(54) DISPLAY APPARATUS AND ELECTRONIC DEVICE

(71) Applicant: BOE Technology Group Co., Ltd., Beijing (CN)

(72) Inventors: Shangchieh Chu, Beijing (CN); Xiaofei Luo, Beijing (CN); Yanyan Yang, Beijing (CN); Hong Zhu, Beijing (CN); Zongyuan Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 66 days.

(21) Appl. No.: 17/770,248

(22) PCT Filed: Jun. 1, 2021

(86) PCT No.: PCT/CN2021/097667
§ 371 (c)(1),
(2) Date: Apr. 19, 2022

(87) PCT Pub. No.: WO2021/244526
PCT Pub. Date: Dec. 9, 2021

(65) Prior Publication Data
US 2023/0087798 A1    Mar. 23, 2023

(30) Foreign Application Priority Data
Jun. 3, 2020 (CN) .......................... 202010494987.2

(51) Int. Cl.
*G06F 1/16* (2006.01)
*G09F 9/30* (2006.01)

(52) U.S. Cl.
CPC .......... *G06F 1/1652* (2013.01); *G06F 1/1624* (2013.01); *G06F 1/1656* (2013.01); *G09F 9/301* (2013.01)

(58) Field of Classification Search
CPC .... G06F 1/1652; G06F 1/1624; G06F 1/1656; G09F 9/301
(Continued)

(56) References Cited

U.S. PATENT DOCUMENTS

2012/0204453 A1* 8/2012 Jung ................. G09F 9/301
40/517
2015/0208016 A1   7/2015 Rymer
(Continued)

FOREIGN PATENT DOCUMENTS

CN         201655172 U    11/2010
CN         203759605 U    8/2014
(Continued)

OTHER PUBLICATIONS

CN202010494987.2 first office action and search report.

*Primary Examiner* — Zhengfu J Feng
(74) *Attorney, Agent, or Firm* — IPro, PLLC

(57) ABSTRACT

A displaying device and an electronic device. The displaying device includes: a first housing, a second housing, a flexible screen, a supporting strip and a telescopic rod; first housing and second housing face each other, and the first housing is provided with an opening at a position facing the second housing; one end of flexible screen is winded inside first housing, and the other end protrudes out of opening and is fixed to second housing; one end of supporting strip is winded inside first housing, the other end protrudes out of opening and is fixed to second housing, and a portion of supporting strip that protrudes out of first housing clings to a bottom of flexible screen; and telescopic rod is disposed at a bottom of supporting strip, and one end of telescopic rod is fixed to first housing, and the other end is fixed to the second housing.

19 Claims, 4 Drawing Sheets

(58) Field of Classification Search
USPC .................................................. 361/679.01
See application file for complete search history.

(56) References Cited

U.S. PATENT DOCUMENTS

| | | | |
|---|---|---|---|
| 2016/0161983 A1* | 6/2016 | Lee .................. | G06F 1/1652 |
| | | | 361/749 |
| 2016/0202729 A1* | 7/2016 | Lee .................. | G06F 1/1652 |
| | | | 361/749 |
| 2017/0013726 A1* | 1/2017 | Han .................. | G09F 15/0062 |
| 2017/0156225 A1 | 6/2017 | Heo et al. | |
| 2017/0161868 A1 | 6/2017 | Kim et al. | |
| 2017/0308346 A1 | 10/2017 | Lee et al. | |
| 2018/0049328 A1 | 2/2018 | Choi et al. | |
| 2018/0098440 A1 | 4/2018 | Choi et al. | |
| 2019/0297736 A1 | 9/2019 | Xu et al. | |
| 2021/0327311 A1 | 10/2021 | Han et al. | |

FOREIGN PATENT DOCUMENTS

| | | | |
|---|---|---|---|
| CN | 106340254 A | | 1/2017 |
| CN | 205943347 U | * | 2/2017 |
| CN | 205943347 U | | 2/2017 |
| CN | 106687913 A | | 5/2017 |
| CN | 106816094 A | | 6/2017 |
| CN | 106981254 A | | 7/2017 |
| CN | 107545849 A | | 1/2018 |
| CN | 107731098 A | | 2/2018 |
| CN | 107895541 A | | 4/2018 |
| CN | 108230937 A | | 6/2018 |
| CN | 108369789 A | | 8/2018 |
| CN | 109587299 A | | 4/2019 |
| CN | 109979329 A | | 7/2019 |
| CN | 110047384 A | | 7/2019 |
| CN | 110534024 A | | 12/2019 |
| CN | 111599278 A | | 8/2020 |
| KR | 20200041846 A | | 4/2020 |
| KR | 20200041846 A | * | 4/2020 |

* cited by examiner

DISPLAY APPARATUS AND ELECTRONIC DEVICE

CROSS REFERENCE TO RELEVANT APPLICATIONS

The present disclosure claims the priority of the Chinese patent application filed on Jun. 3, 2020 before the Chinese Patent Office with the application number of 202010494987.2 and the title of "DISPLAY APPARATUS AND ELECTRONIC DEVICE", which is incorporated herein in its entirety by reference.

TECHNICAL FIELD

The present disclosure relates to the technical field of electronic devices, and particularly relates to a displaying device and an electronic device.

BACKGROUND

With the increasingly higher requirements on the usage experience by users, users are having increasingly higher requirements on the performance and the functional diversity of displaying devices. Curled displaying devices are novel displaying devices. In the state that the display screen is deployed, the area of the displaying region can be higher. In the state that the display screen is curled, the volume of the entire device can be lower, which facilitates carrying. Therefore, they have been paid great attention.

SUMMARY

The embodiments of the present disclosure provide a displaying device and an electronic device.

In the first aspect, an embodiment of the present disclosure discloses a displaying device, the displaying device includes a first housing, a second housing, a flexible screen, a supporting strip and a telescopic rod, wherein
  the first housing and the second housing face each other, and the first housing is provided with an opening at a position facing the second housing;
  one end of the flexible screen is winded inside the first housing, and the other end protrudes out of the opening and is fixed to the second housing;
  one end of the supporting strip is winded inside the first housing, the other end protrudes out of the opening and is fixed to the second housing, and a portion of the supporting strip that protrudes out of the first housing clings to a bottom of the flexible screen; and
  the telescopic rod is disposed at a bottom of the supporting strip, one end of the telescopic rod is fixed to the first housing, and the other end is fixed to the second housing.

Optionally, a ferromagnetic film is disposed at the bottom of the flexible screen; and
  the supporting strip includes a bottom film and a plurality of metal sheets, the plurality of metal sheets are adhered to the bottom film side by side in a direction of deployment of the supporting strip, the metal sheets are closer to the flexible screen, and the metal sheets and the ferromagnetic film are connected by magnetic attraction.

Optionally, a slot is disposed on one side of the metal sheets that is closer to the flexible screen, and a magnetic piece is embedded inside the slot.

Optionally, an outer surface of the magnetic piece and an outer surface of the metal sheets flush.

Optionally, a plurality of slots are disposed on each of the metal sheets, and the plurality of slots are at least arranged at a central region and edge regions at two ends of the metal sheet.

Optionally, the metal sheets are made from a magnetic material.

Optionally, the bottom film includes at least one of a polyimide thin film, a thermoplastic-polyester film and a woven fabric.

Optionally, a range of a thickness of the ferromagnetic film is 20 micrometers to 150 micrometers.

Optionally, the ferromagnetic film is made from a ferromagnetic material.

Optionally, a first scroll rolling mechanism and a second scroll rolling mechanism are disposed inside the first housing;
  one end of the flexible screen is fixed to the first scroll rolling mechanism, and is winded to the first scroll rolling mechanism; and
  one end of the supporting strip is fixed to the second scroll rolling mechanism, and is winded to the second scroll rolling mechanism.

Optionally, the first scroll rolling mechanism includes a driving shaft and a driven shaft that face each other and are separately arranged, and a caterpillar band winded outside the driving shaft and the driven shaft;
  one end of the flexible screen is fixed to the caterpillar band, and is winded to the caterpillar band;
  the driving shaft and the driven shaft are rotatably connected inside the first housing; and
  the driving shaft is connected to a first driving member, and the first driving member is configured for driving the driving shaft to rotate, to drive the caterpillar band to rotate in a direction that curls the flexible screen into the first housing.

Optionally, the first driving member is a torsional spring.

Optionally, a plurality of projections are disposed on an outer surface of the driving shaft; and
  a plurality of slots are disposed on a surface of the caterpillar band that clings to the driving shaft, the slots and the projections are engaged, and a surface of the caterpillar band that is further from the driving shaft is a smooth surface.

Optionally, the second scroll rolling mechanism includes a rotation shaft and a second driving member;
  one end of the supporting strip is fixed to the rotation shaft, and is winded to the rotation shaft;
  the rotation shaft is rotatably connected inside the first housing; and
  the second driving member is connected to the rotation shaft, and the second driving member is configured for driving the rotation shaft to rotate, to drive the rotation shaft to rotate in a direction that curls the supporting strip into the first housing.

Optionally, the second driving member is a torsional spring.

Optionally, the telescopic rod includes a plurality of connecting rods that are sequentially slidably connected, and between any two neighboring instances of the connecting rods, one of the connecting rods is embedded in the other of the connecting rods; and
  first side faces of the plurality of connecting rods that are connected to the supporting strip flush.

Optionally, the displaying device further includes a clamping mechanism, the clamping mechanism is disposed inside the first housing, and is adjacent to the opening, and the clamping mechanism clamps the flexible screen and the supporting strip, so that the portion of the supporting strip that protrudes out of the first housing clings to the bottom of the flexible screen.

Optionally, the clamping mechanism includes a first roller wheel and a second roller wheel that face each other and are separately arranged, and the flexible screen and the supporting strip are clamped between the first roller wheel and the second roller wheel.

In the second aspect, an embodiment of the present disclosure further discloses an electronic device, wherein the electronic device includes the displaying device stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art can obtain other figures according to these figures without paying creative work.

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

An embodiment of the present disclosure provides a displaying device. The displaying device may be a curled displaying device. Particularly, the displaying device may be used as the displaying module of an electronic device, and may also be used as an auxiliary device of an electronic device. When it is required to obtain a large displaying area, the displaying device is electrically connected to the electronic device, and then the displaying device is deployed for use. The particular usage scenes of the displaying device are not particularly limited in the embodiments of the present disclosure.

Figure 1:
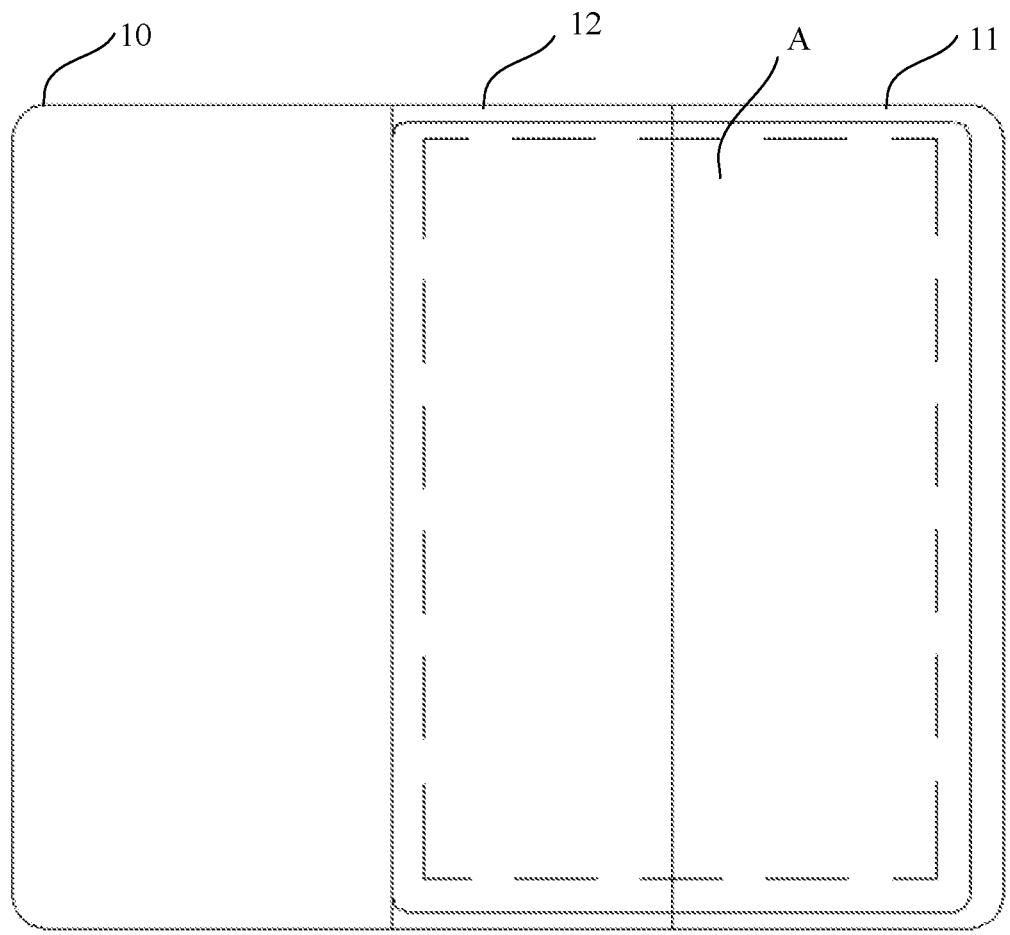
FIG. 1 is a schematic structural diagram of a displaying device according to the present disclosure when the displaying device is in a curled state.
Figure 2:
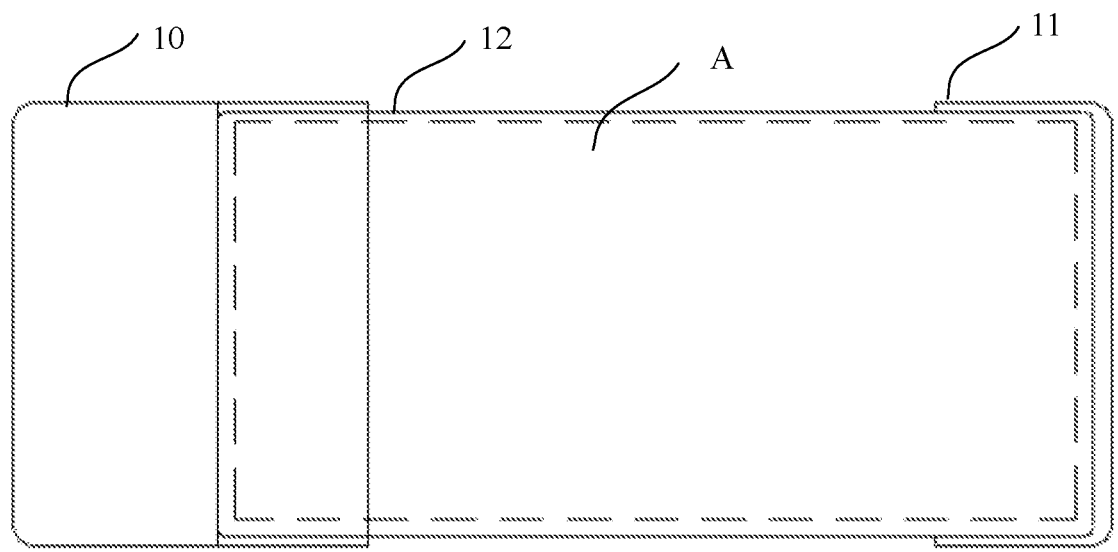
FIG. 2 is a schematic structural diagram of the displaying device shown in FIG. 1 when the displaying device is in a deployed state.
Figure 3:
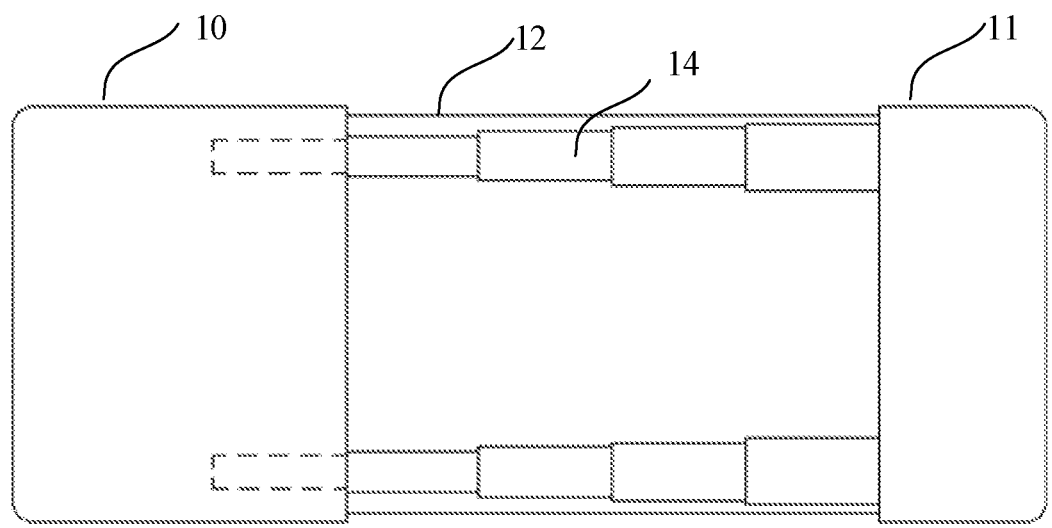
FIG. 3 is a reverse schematic structural diagram of the displaying device shown in FIG. 2.
Figure 4:
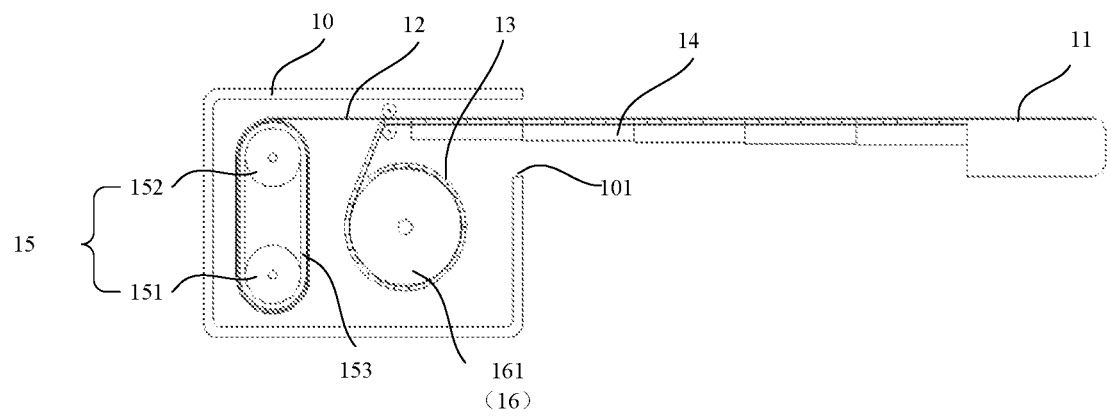
FIG. 4 is a side schematic structural diagram of the displaying device shown in FIG. 2.

Referring to FIG. 1, FIG. 1 shows a schematic structural diagram of a displaying device according to the present disclosure when the displaying device is in a curled state. Referring to FIG. 2, FIG. 2 shows a schematic structural diagram of the displaying device shown in FIG. 1 when the displaying device is in a deployed state. Referring to FIG. 3, FIG. 3 shows a reverse schematic structural diagram of the displaying device shown in FIG. 2. Referring to FIG. 4, FIG. 4 shows a side schematic structural diagram of the displaying device shown in FIG. 2. The displaying device may particularly include a first housing 10, a second housing 11, a flexible screen 12, a supporting strip 13 and a telescopic rod 14.

The first housing 10 and the second housing 11 face each other, and the first housing 10 is provided with an opening 101 at the position facing the second housing 11.

One end of the flexible screen 12 is winded inside the first housing 10, and the other end protrudes out of the opening 101 and is fixed to the second housing 11.

One end of the supporting strip 13 is winded inside the first housing 10, the other end protrudes out of the opening 101 and is fixed to the second housing 11, and the portion of the supporting strip 13 that protrudes out of the first housing 10 clings to the bottom of the flexible screen 12.

The telescopic rod 14 is disposed at the bottom of the supporting strip 13, and one end of the telescopic rod 14 is fixed to the first housing 10, and the other end is fixed to the second housing 11.

As shown in FIG. 1, when the displaying device is in the curled state, the major part of the flexible screen 12 is curled inside the first housing 10, and the displaying region A of the displaying device has a lower area. As shown in FIG. 2, when the displaying device is in the deployed state, the major part of the flexible screen 12 may be pulled out of the first housing 10, and the displaying region A has a higher area.

In the embodiments of the present disclosure, when it is required to deploy the flexible screen 12 to obtain a large displaying area, the flexible screen 12 and the supporting strip 13 may be pulled out of the first housing 10 by stretching the second housing 11. Because the portion of the supporting strip 13 that protrudes out of the first housing 10 clings to the bottom of the flexible screen 12, the supporting strip 13 can be used to realize bottom supporting of the flexible screen 12. Furthermore, because the telescopic rod 14 is disposed at the bottom of the supporting strip 13, the telescopic rod 14 can be used to support the supporting strip 13, which increases the strength of the supporting to the flexible screen 12 by the supporting strip 13. That cannot only prevent local deformation of the flexible screen 12, but also, when the flexible screen 12 is being pressed, can prevent shaking of the flexible screen 12, which facilitates the touch-controlling operations on the flexible screen 12.

In an embodiment of the present disclosure, a first scroll rolling mechanism 15 and a second scroll rolling mechanism 16 are disposed inside the first housing 10; one end of the flexible screen 12 is fixed to the first scroll rolling mechanism 15, and is winded to the first scroll rolling mechanism 15; and one end of the supporting strip 13 is fixed to the second scroll rolling mechanism 16, and is winded to the second scroll rolling mechanism 16.

Particularly, both of the first scroll rolling mechanism 15 and the second scroll rolling mechanism 16 may be rotatably connected inside the first housing 10. As shown in FIG. 4, when the first scroll rolling mechanism 15 is being rotated anticlockwise, the area of the flexible screen 12 that is winded to the first scroll rolling mechanism 15 can be increased, and the area of the displaying region A of the displaying device can be reduced. When the first scroll rolling mechanism 15 is being rotated clockwise, the area of the flexible screen 12 that is winded to the first scroll rolling mechanism 15 can be reduced, and the area of the displaying region A of the displaying device can be increased. Likewise, when the second scroll rolling mechanism 16 is being rotated anticlockwise, the area of the supporting strip 13 that is winded to the second scroll rolling mechanism 16 can be increased, and the area of the displaying region A of the displaying device can be reduced. When the second scroll rolling mechanism 16 is being rotated clockwise, the area of the supporting strip 13 that is winded to the second scroll rolling mechanism 16 can be reduced, and the area of the displaying region A of the displaying device can be increased.

Optionally, the first scroll rolling mechanism 15 may include a driving shaft 151 and a driven shaft 152 that face each other and are separately arranged, and a caterpillar band 153 winded outside the driving shaft 151 and the driven shaft 152; one end of the flexible screen 12 is fixed to the caterpillar band 153, and is winded to the caterpillar band 153; the driving shaft 151 and the driven shaft 152 may be rotatably connected inside the first housing 10; and the driving shaft 151 is connected to a first driving member (not shown in the drawings), and the first driving member is configured for driving the driving shaft 151 to rotate, to drive the caterpillar band 153 to rotate in the direction that curls the flexible screen 12 into the first housing 10.

Particularly, because one end of the flexible screen 12 is fixed to the caterpillar band 153, and the caterpillar band 153 is winded outside the driving shaft 151 and the driven shaft 152, when it is required to pull the flexible screen 12 out of the first housing 10, the flexible screen 12 may be pulled out of the first housing 10 by stretching the second housing 11, and the caterpillar band 153, the driving shaft 151 and the driven shaft 152 are driven to rotate in the clockwise direction, to reduce the area of the flexible screen 12 that is winded to the caterpillar band 153. When it is required to roll and retract the flexible screen 12 back into the first housing 10, the first driving member may drive the driving shaft 151 to rotate anticlockwise, and drive, by the anticlockwise rotation of the driving shaft 151, the driven shaft 152 and the caterpillar band 153 to rotate anticlockwise, to increase the area of the flexible screen 12 that is winded to the caterpillar band 153.

In the embodiments of the present disclosure, by providing at the first scroll rolling mechanism 15 the driving shaft 151 and the driven shaft 152 that face each other and are separately arranged, and rolling the flexible screen 12 to the driving shaft 151 and the driven shaft 152 via the caterpillar band 153, the spacing between the driving shaft 151 and the driven shaft 152 can be regulated according to the requirement on the tension force of the flexible screen 12, which prevents damage on the flexible screen 12 by a too large tension force, to prolong the service life of the flexible screen 12.

It should be noted that, in practical applications, the positions of the driving shaft 151 and the driven shaft 152 may be exchanged. The particular positions of the driving shaft 151 and the driven shaft 152 are not limited in the embodiments of the present disclosure.

Optionally, the first driving member is a torsional spring. Particularly, the torsional spring may be nested to the driving shaft 151. When the flexible screen 12 is in the deployed state shown in FIG. 2, the torsional spring may apply to the driving shaft 151 a restoring force of anticlockwise rotation, to drive, by the anticlockwise rotation of the driving shaft 151, the caterpillar band 153 to rotate anticlockwise, whereby the flexible screen 12 can be automatically winded to the caterpillar band 153, to improve the usage experience of the user.

It can be understood that, in particular applications, a person skilled in the art may also select a driving member such as an electric machine, an electric motor and a hydraulic motor as the first driving member according to practical demands. The particular form of the first driving member is not limited in the embodiments of the present disclosure.

In some optional embodiments, a plurality of projections are disposed on the outer surface of the driving shaft 151; and a plurality of slots are disposed on the surface of the caterpillar band 153 that clings to the driving shaft 151, the slots and the projections are engaged, and the surface of the caterpillar band 153 that is further from the driving shaft 151 is a smooth surface.

Particularly, because the slots on the caterpillar band 153 and the projections on the driving shaft 151 are engaged, the friction between the caterpillar band 153 and the driving shaft 151 can be increased, which prevents slipping between the caterpillar band 153 and the driving shaft 151, and, in turn, can improve the linkage between the driving shaft 151 and the driven shaft 152. Moreover, by configuring the surface of the caterpillar band 153 that is further from the driving shaft 151 as a smooth surface, the caterpillar band 153 can be prevented from damaging the flexible screen 12 winded thereto, to prolong the service life of the flexible screen 12.

Particularly, the projections on the driving shaft 151 may be gears, textures or other features that can increase the surface roughness. The particular form of the projections is not limited in the embodiments of the present disclosure.

Optionally, the second scroll rolling mechanism 16 may include a rotation shaft 161 and a second driving member (not shown in the drawings); one end of the supporting strip 13 is fixed to the rotation shaft 161, and is winded to the rotation shaft 161; the rotation shaft 161 may be rotatably connected inside the first housing 10; and the second driving member is connected to the rotation shaft 161, the second driving member is configured for driving the rotation shaft 161 to rotate, to drive the rotation shaft 161 to rotate in the direction that curls the supporting strip 13 into the first housing 10.

In practical applications, the movements of the second scroll rolling mechanism 16 and the first scroll rolling mechanism 15 can be maintained consistent, whereby the supporting strip 13 can sufficiently support the flexible screen 12, to realize bottom supporting to the flexible screen 12.

Optionally, the second driving member is a torsional spring. Particularly, the torsional spring may be nested to the rotation shaft 161. When the flexible screen 12 is in the deployed state shown in FIG. 2, the torsional spring may apply to the rotation shaft 161 a restoring force of anticlockwise rotation, to drive, by the anticlockwise rotation of the rotation shaft 161, the supporting strip 13 to rotate anticlockwise, whereby the supporting strip 13 can be automatically winded to the rotation shaft 161, to improve the usage experience of the user.

It can be understood that, in particular applications, a person skilled in the art may also select a driving member such as an electric machine, an electric motor and a hydraulic motor as the second driving member according to practical demands. The particular form of the second driving member is not limited in the embodiments of the present disclosure.

In some embodiments of the present disclosure, the displaying device may further include a clamping mechanism 17, the clamping mechanism 17 is disposed inside the first housing 10, and is adjacent to the opening 101, and the clamping mechanism 101 may clamp the flexible screen 12 and the supporting strip 13, so that the portion of the supporting strip 13 that protrudes out of the first housing 10 clings to the bottom of the flexible screen 12.

In practical applications, because the clamping mechanism 17 is adjacent to the opening 101 of the first housing 10, and can clamp the flexible screen 12 and the supporting strip 13, before the flexible screen 12 and the supporting strip 13 protrudes out of the opening 101 of the first housing 10, the clamping mechanism 17 can clamp the flexible screen 12 and the supporting strip 13 to be in a clinging state, so that the portion of the supporting strip 13 that protrudes out of the first housing 10 clings to the bottom of the flexible screen 12, which increases the reliability of the supporting to the flexible screen 12 by the supporting strip 13.

Optionally, the clamping mechanism 17 may include a first roller wheel 171 and a second roller wheel 172 that face each other and are separately arranged, and the flexible screen 12 and the supporting strip 13 may be clamped between the first roller wheel 171 and the second roller wheel 172.

In practical applications, the first roller wheel 171 and the second roller wheel 172 may face each other and form a gap, whereby the flexible screen 12 and the supporting strip 13 can pass through the gap. Accordingly, in an aspect, the first roller wheel 171 and the second roller wheel 172 can form a reasonable clamping force to the flexible screen 12 and the supporting strip 13, and, in another aspect, adverse affection on the flexible screen 12 caused by a too large clamping force between the first roller wheel 171 and the second roller wheel 172 can be prevented.

In some embodiments of the present disclosure, a ferromagnetic film is disposed at the bottom of the flexible screen 12. The ferromagnetic film can be used to ameliorate the problems of deployment and warping after the flexible screen 12 has been bent, and facilitate the resilience and the supporting property of the flexible screen 12 in the deployed state. In order to realize the sufficient supporting to the flexible screen 12 and prevent and reduce the affection on the flexibility of the flexible screen 12, the thickness of the ferromagnetic film may preferably be 20 micrometers to 150 micrometers.

Particularly, the ferromagnetic film may be made from a ferromagnetic material such as iron, steel, nickel and cobalt. As an example, the ferromagnetic film may be a steel-sheet layer (of a thickness of 20 micrometers to 30 micrometers), or a steel-sheet layer having a porous structure (of a thickness of below 150 micrometers).

Figure 5:
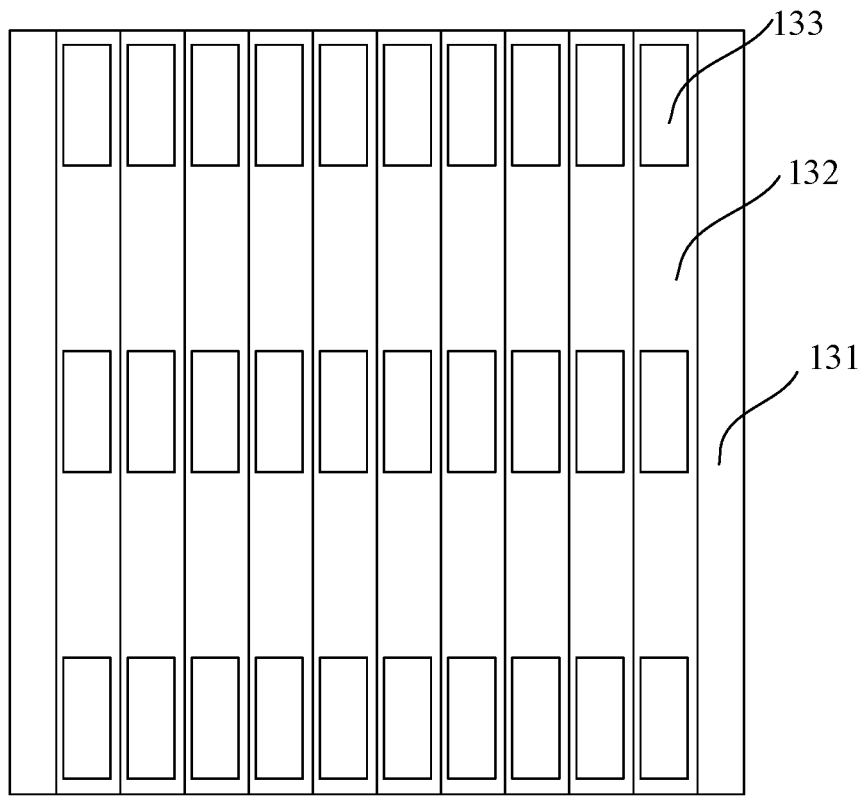
FIG. 5 is a schematic structural diagram of a supporting strip according to the present disclosure.
Figure 6:
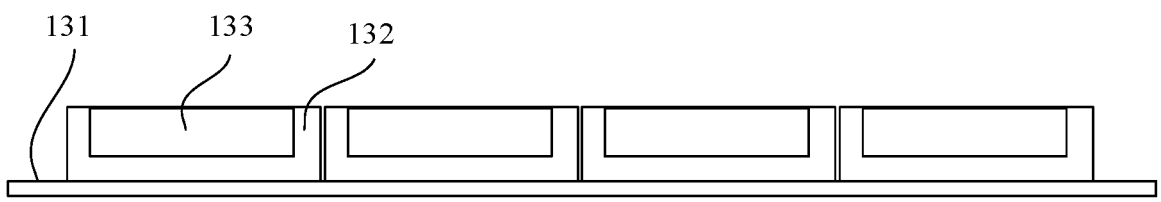
FIG. 6 is a schematic structural diagram of a side-face section of the supporting strip shown in FIG. 5.

Referring to FIG. 5, FIG. 5 shows a schematic structural diagram of a supporting strip according to the present disclosure. Referring to FIG. 6, FIG. 6 shows a schematic structural diagram of a side-face section of the supporting strip shown in FIG. 5. as shown in FIGS. 5 and 6, the supporting strip 13 may include a bottom film 131 and a plurality of metal sheets 132, the plurality of metal sheets 132 are adhered to the bottom film 131 side by side in the direction of deployment of the supporting strip 13, whereby the supporting strip 13 has a rollable flexibility, the metal sheets 132 are closer to the flexible screen 12, and the metal sheets 132 and the ferromagnetic film are connected by magnetic attraction.

In practical applications, because the supporting strip 13 is provided with the metal sheets 132, and the metal sheets 132 have a high strength, they can increase the reliability of the supporting to the flexible screen 12 by the supporting strip 13. Furthermore, because the metal sheets 132 are connected to the ferromagnetic film at the bottom of the flexible screen 12 by magnetic attraction, they can enable the connection between the portion of the supporting strip 13 that protrudes out of the first housing 10 and the bottom of the flexible screen 12 to be more reliable, which further increases the reliability of the supporting to the flexible screen 12 by the supporting strip 13.

Optionally, a slot is disposed on the side of the metal sheets 132 that is closer to the flexible screen 12, and a magnetic piece 133 is embedded inside the slot. The magnetic pieces 133 may be used to provide the function of magnetic attraction to the ferromagnetic film at the bottom of the flexible screen 12.

Particularly, the magnetic pieces 133 may be a component that can generate a magnetic attraction force such as magnetic steel and magnetic iron, and the metal sheets 132 may be steel sheets, aluminum sheets, alloy sheets and so on. The particular forms of the magnetic pieces 133 and the metal sheets 132 are not limited in the embodiments of the present disclosure.

In an embodiment of the present disclosure, the outer surface of the magnetic piece 133 and the outer surface of the metal sheets 132 flush. That enables the magnetic pieces 133 and the metal sheets 132 to sufficiently contact the bottom of the flexible screen 12, which increases the reliability of the connection between the supporting strip 13 and the flexible screen 12, and, in turn, can increase the reliability of the supporting to the flexible screen 12 by the supporting strip 13.

In practical applications, a plurality of slots are disposed on each of the metal sheets 132, and the plurality of slots are at least arranged at a central region and edge regions at the two ends of the metal sheets 132, whereby the magnetic pieces 133 can be correspondingly disposed at the central region and the edge regions at the two ends of the metal sheet 132. Accordingly, all of the edge regions and the central region of the metal sheet 132 can have magnetic attraction to the ferromagnetic film on the flexible screen 12, which further increases the reliability of the connection between the supporting strip 13 and the flexible screen 12.

Particularly, the metal sheets 131 may be elongate metal sheets, and the two ends of the metal sheets 131 may be the two ends of the metal sheets 131 in the length direction.

It can be understood that FIGS. 5 and 6 merely show the case in which each of the metal sheets 131 is provided with the magnetic pieces 133, but, in practical applications, the magnetic pieces 133 may also be disposed at some of the metal sheets 131, which is not limited in the embodiments of the present disclosure.

In some other optional embodiments of the embodiments according to the present disclosure, the metal sheets 132 may be made from a magnetic material. Particularly, the magnetic material may be a material that can generate a magnetic attraction action such as magnetic iron and magnetic steel. In practical applications, when the metal sheets 132 are made from the magnetic material, the metal sheets 132 can realize an all-round magnetic attraction action to the ferromagnetic film at the bottom of the flexible screen 12, which increases the reliability of the connection between the supporting strip 13 and the flexible screen 12.

It can be understood that, in practical applications, the metal sheets 132 may be made from the magnetic material, or the magnetic pieces 133 may be disposed at the metal sheets 132, or the combination of the two modes may be used.

In practical applications, in order to prevent adverse affection on the display panel of the flexible screen 12 by the magnetic attraction force between the ferromagnetic film at the bottom of the flexible screen 12 and the supporting strip 13, a flexible electromagnetic shielding layer may be provided between the display panel of the flexible screen 12 and the ferromagnetic film, to shield the magnetic attraction force.

Optionally, the bottom film 131 may include at least one of a polyimide thin film, a thermoplastic-polyester film and a woven fabric, whereby the bottom film 131 can balance a good flexibility and a high strength.

Figure 7:
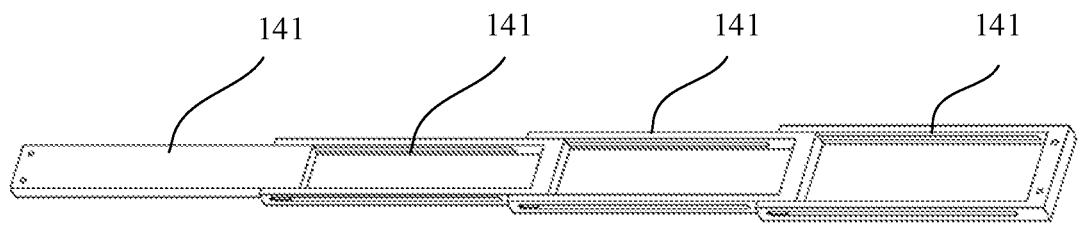
FIG. 7 is a schematic axially structural diagram of the telescopic rod according to the present disclosure.
Figure 8:
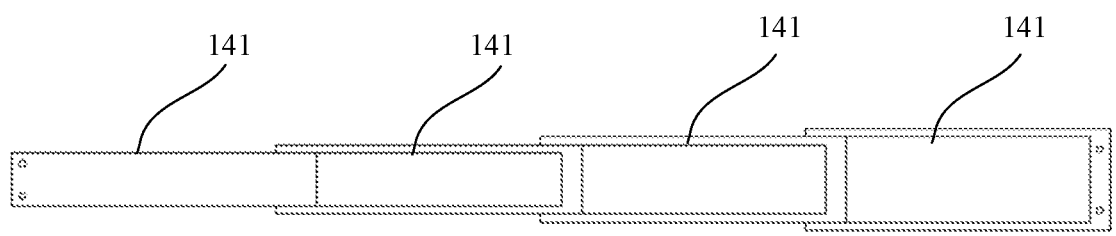
FIG. 8 is a schematic structural diagram of the telescopic rod shown in FIG. 7 at a certain angle.
Figure 9:
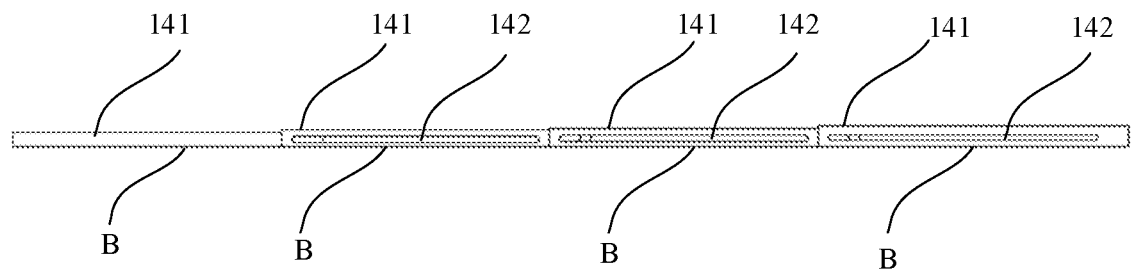
FIG. 9 is a reverse schematic structural diagram of the telescopic rod shown in FIG. 8.

Referring to FIG. 7, FIG. 7 shows a schematic axially structural diagram of the telescopic rod according to the present disclosure. Referring to FIG. 8, FIG. 8 shows a schematic structural diagram of the telescopic rod shown in FIG. 7 at a certain angle. Referring to FIG. 9, FIG. 9 shows a reverse schematic structural diagram of the telescopic rod shown in FIG. 8. The telescopic rod 14 may particularly include a plurality of connecting rods 141 that are sequentially slidably connected, and between any two neighboring connecting rods 141, one of the connecting rods 141 may be embedded in the other of the connecting rods 141, wherein first side faces B of the plurality of connecting rods 141 that are connected to the supporting strip 13 flush, whereby each of the connecting rods 141 can cling to the supporting strip 13, to increase the reliability of the supporting to the supporting strip 13 by the telescopic rod 14.

Particularly, the connecting rods 141 may be configured to be of a hollow frame structure, and guide slots 142 may be disposed on the side wall of the frame structure, whereby between any two neighboring connecting rods 141, one of the connecting rods 141 may be embedded in the guide slot 142 on the side wall of the other of the connecting rods 141, so that first side faces B of the plurality of connecting rods 141 that are connected to the supporting strip 13 flush.

In conclusion, the displaying device according to the embodiments of the present disclosure has at least the following advantages:

In the embodiments of the present disclosure, one end of the flexible screen is winded inside the first housing, and the other end protrudes out of the opening and is fixed to the second housing; and one end of the supporting strip is winded inside the first housing, and the other end protrudes out of the opening and is fixed to the second housing. When it is required to deploy the flexible screen, the flexible screen and the supporting strip may be pulled out of the first housing by stretching the second housing. Because the portion of the supporting strip that protrudes out of the first housing clings to the bottom of the flexible screen, the supporting strip can be used to realize bottom supporting of the flexible screen. Furthermore, because the telescopic rod is disposed at the bottom of the supporting strip, the telescopic rod can be used to support the supporting strip, which increases the strength of the supporting to the flexible screen by the supporting strip. That cannot only prevent local deformation of the flexible screen, but also, when the flexible screen is being pressed, can prevent shaking of the flexible screen, which facilitates the touch-controlling operations on the flexible screen.

An embodiment of the present disclosure further provides an electronic device, wherein the electronic device particularly includes the displaying device stated above.

It should be noted that, in the present embodiment, the particular structure and the operation mode of the displaying device may be the same as those of the displaying device according to the above embodiments, which is not discussed herein further.

Particularly, the displaying device may be used as the displaying module of the electronic device, and may also be used as an auxiliary device of the electronic device. The modes of usage of the displaying device in the electronic device are not particularly limited in the embodiments of the present disclosure.

In an embodiment of the present disclosure, in the displaying device, the supporting strip can be used to realize bottom supporting of the flexible screen. Furthermore, because the telescopic rod is disposed at the bottom of the supporting strip, the telescopic rod can be used to support the supporting strip, which increases the strength of the supporting to the flexible screen by the supporting strip. That cannot only prevent local deformation of the flexible screen, but also, when the flexible screen is being pressed, can prevent shaking of the flexible screen, which facilitates the touch-controlling operations on the flexible screen.

The embodiments of the description are described in the mode of progression, each of the embodiments emphatically describes the differences from the other embodiments, and the same or similar parts of the embodiments may refer to each other.

Although preferable embodiments of the embodiments of the present disclosure have been described, once a person skilled in the art has known the essential inventive concept, he may make further variations and modifications on those embodiments. Therefore, the appended claims are intended to be interpreted as including the preferable embodiments and all of the variations and modifications that fall within the scope of the embodiments of the present disclosure.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices. Unless further limitation is set forth, an element defined by the wording "comprising a . . . " does not exclude additional same element in the process, method, article or terminal device comprising the element.

The displaying device and the electronic device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. A displaying device, the displaying device comprising a first housing, a second housing, a flexible screen, a supporting strip and a telescopic rod, wherein
the first housing and the second housing face each other, and the first housing is provided with an opening at a position facing the second housing;
one end of the flexible screen is winded inside the first housing, and an other end protrudes out of the opening and is fixed to the second housing;
one end of the supporting strip is winded inside the first housing, the other end protrudes out of the opening and is fixed to the second housing, and a portion of the supporting strip that protrudes out of the first housing clings to a bottom of the flexible screen; and
the telescopic rod is disposed at a bottom of the supporting strip, one end of the telescopic rod is fixed to the first housing, and the other end is fixed to the second housing;
a ferromagnetic film is disposed at the bottom of the flexible screen; and
the supporting strip comprises a bottom film and a plurality of metal sheets, the plurality of metal sheets are adhered to the bottom film side by side in a direction of deployment of the supporting strip, the metal sheets are closer to the flexible screen, and the metal sheets and the ferromagnetic film are connected by magnetic attraction.

2. The displaying device according to claim 1, wherein a slot is disposed on one side of the metal sheets that is closer to the flexible screen, and a magnetic piece is embedded inside the slot.

3. The displaying device according to claim 2, wherein an outer surface of the magnetic piece and an outer surface of the metal sheets are flush.

4. The displaying device according to claim 2, wherein a plurality of slots are disposed on each of the metal sheets, and the plurality of slots are at least arranged at a central region and edge regions at two ends of the metal sheet.

5. The displaying device according to claim 1, wherein the metal sheets are made from a magnetic material.

6. The displaying device according to claim 1, wherein the bottom film comprises at least one of a polyimide thin film, a thermoplastic-polyester film and a woven fabric.

7. The displaying device according to claim 1, wherein a range of a thickness of the ferromagnetic film is 20 micrometers to 150 micrometers.

8. The displaying device according to claim 1, wherein the ferromagnetic film is made from a ferromagnetic material.

9. The displaying device according to claim 1, wherein a first scroll rolling mechanism and a second scroll rolling mechanism are disposed inside the first housing;
the one end of the flexible screen is fixed to the first scroll rolling mechanism, and is winded to the first scroll rolling mechanism; and
the one end of the supporting strip is fixed to the second scroll rolling mechanism, and is winded to the second scroll rolling mechanism.

10. The displaying device according to claim 9, wherein the first scroll rolling mechanism comprises a driving shaft and a driven shaft that face each other and are separately arranged, and a caterpillar band winded outside the driving shaft and the driven shaft;
the one end of the flexible screen is fixed to the caterpillar band, and is winded to the caterpillar band;
the driving shaft and the driven shaft are rotatably connected inside the first housing; an d the driving shaft is connected to a first driving member, and the first driving member is configured for driving the driving shaft to rotate, to drive the caterpillar band to rotate in a direction that curls the flexible screen into the first housing.

11. The displaying device according to claim 10, wherein the first driving member is a torsional spring.

12. The displaying device according to claim 10, wherein a plurality of projections are disposed on an outer surface of the driving shaft; and
a plurality of slots are disposed on a surface of the caterpillar band that clings to the driving shaft, the slots and the projections are engaged, and a surface of the caterpillar band that is further from the driving shaft is a smooth surface.

13. The displaying device according to claim 9, wherein the second scroll rolling mechanism comprises a rotation shaft and a second driving member;
one end of the supporting strip is fixed to the rotation shaft, and is winded to the rotation shaft;
the rotation shaft is rotatably connected inside the first housing; and
the second driving member is connected to the rotation shaft, and the second driving member is configured for driving the rotation shaft to rotate, to drive the rotation shaft to rotate in a direction that curls the supporting strip into the first housing.

14. The displaying device according to claim 13, wherein the second driving member is a torsional spring.

15. The displaying device according to claim 1, wherein the telescopic rod comprises a plurality of connecting rods that are sequentially slidably connected, and between any two neighboring instances of the connecting rods, one of the connecting rods is embedded in the other of the connecting rods; and
first side faces of the plurality of connecting rods that are connected to the supporting strip are flush with each other.

16. The displaying device according to claim 1, wherein the displaying device further comprises a clamping mechanism, the clamping mechanism is disposed inside the first housing, and is adjacent to the opening, and the clamping mechanism clamps the flexible screen and the supporting strip, so that the portion of the supporting strip that protrudes out of the first housing clings to the bottom of the flexible screen.

17. The displaying device according to claim 16, wherein the clamping mechanism comprises a first roller wheel and a second roller wheel that face each other and are separately arranged, and the flexible screen and the supporting strip are clamped between the first roller wheel and the second roller wheel.

18. An electronic device, wherein the electronic device comprises the displaying device according to claim 1.

19. The displaying device according to claim 1, wherein the displaying device further comprises a clamping mechanism, the clamping mechanism is disposed inside the first housing, and is adjacent to the opening, and the clamping mechanism clamps the flexible screen and the supporting strip, so that the portion of the supporting strip that protrudes out of the first housing clings to the bottom of the flexible screen.

* * * * *